United States Patent
Eber et al.

(10) Patent No.: US 10,018,269 B2
(45) Date of Patent: Jul. 10, 2018

(54) NORMALLY HIGH ACTING LINEAR FORCE SOLENOID

(71) Applicant: GM Global Technology Operations LLC, Detroit, MI (US)

(72) Inventors: Kelly E. Eber, Oxford, MI (US); Todd R. Berger, Pinckney, MI (US); Christopher G. Benson, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 128 days.

(21) Appl. No.: 14/880,394

(22) Filed: Oct. 12, 2015

(65) Prior Publication Data
US 2016/0123461 A1    May 5, 2016

Related U.S. Application Data

(60) Provisional application No. 62/073,523, filed on Oct. 31, 2014.

(51) Int. Cl.
| | |
|---|---|
| *F16H 61/02* | (2006.01) |
| *F16K 31/06* | (2006.01) |
| *F16K 27/04* | (2006.01) |

(52) U.S. Cl.
CPC ....... *F16H 61/0276* (2013.01); *F16K 27/048* (2013.01); *F16K 31/0613* (2013.01); *F16H 2061/0279* (2013.01)

(58) Field of Classification Search
CPC ......... F16H 61/0276; F16H 2061/0279; F16K 27/048; F16K 31/0613; Y10T 137/86622; Y10T 137/8671

USPC ..................... 137/625.65, 625.69
See application file for complete search history.

(56) References Cited

U.S. PATENT DOCUMENTS

| | | | | |
|---|---|---|---|---|
| 3,410,308 | A | * 11/1968 | Moog, Jr. | ........... F15B 13/0438 137/549 |
| 5,247,965 | A | 9/1993 | Oka | |
| 5,248,126 | A | 9/1993 | Prüss | |
| 5,878,782 | A | 3/1999 | Nakajima | |
| 6,289,921 | B1 | 9/2001 | Neuhaus | |
| 7,082,965 | B2 | 8/2006 | Holmes | |
| 7,131,410 | B2 | 11/2006 | Kondo | |
| 8,397,759 | B2 | * 3/2013 | Oikawa | ............... F16K 11/0716 137/596.2 |
| 8,602,060 | B2 | 12/2013 | Olson et al. | |
| 2007/0176720 | A1 | * 8/2007 | Janssen | ................. H01F 7/1607 335/270 |
| 2011/0140026 | A1 | * 6/2011 | Togawa | .............. F16H 61/0276 251/321 |

(Continued)

FOREIGN PATENT DOCUMENTS

| | | |
|---|---|---|
| AU | 000006111169 A | 3/1971 |
| CN | 1834281 A | 9/2006 |

(Continued)

*Primary Examiner* — Craig Schneider
*Assistant Examiner* — Nicole Gardner

(57) ABSTRACT

A solenoid assembly is disposed in a bore of a valve body where the bore includes a plurality of ports. The solenoid assembly includes a bushing or sleeve disposed in the bore. The sleeve has at least one slot that is aligned with at least one of the plurality of ports. A valve is slidably disposed within the sleeve. A solenoid has a movable armature configured to move the valve.

8 Claims, 5 Drawing Sheets

(56) References Cited

U.S. PATENT DOCUMENTS

2013/0126766 A1* 5/2013 Haupt ................ F15B 13/0403
 251/28
2014/0007964 A1* 1/2014 Schulz ............... G05D 16/2013
 137/625.64

FOREIGN PATENT DOCUMENTS

| CN | 101387343 A | 3/2009 |
| CN | 102301167 A | 12/2011 |
| CN | 103244740 A | 8/2013 |
| DE | 102008046803 A1 | 3/2010 |
| DE | 102008056511 A1 | 5/2010 |
| WO | 2006066314 A1 | 6/2006 |
| WO | 2006079382 A1 | 8/2006 |

* cited by examiner

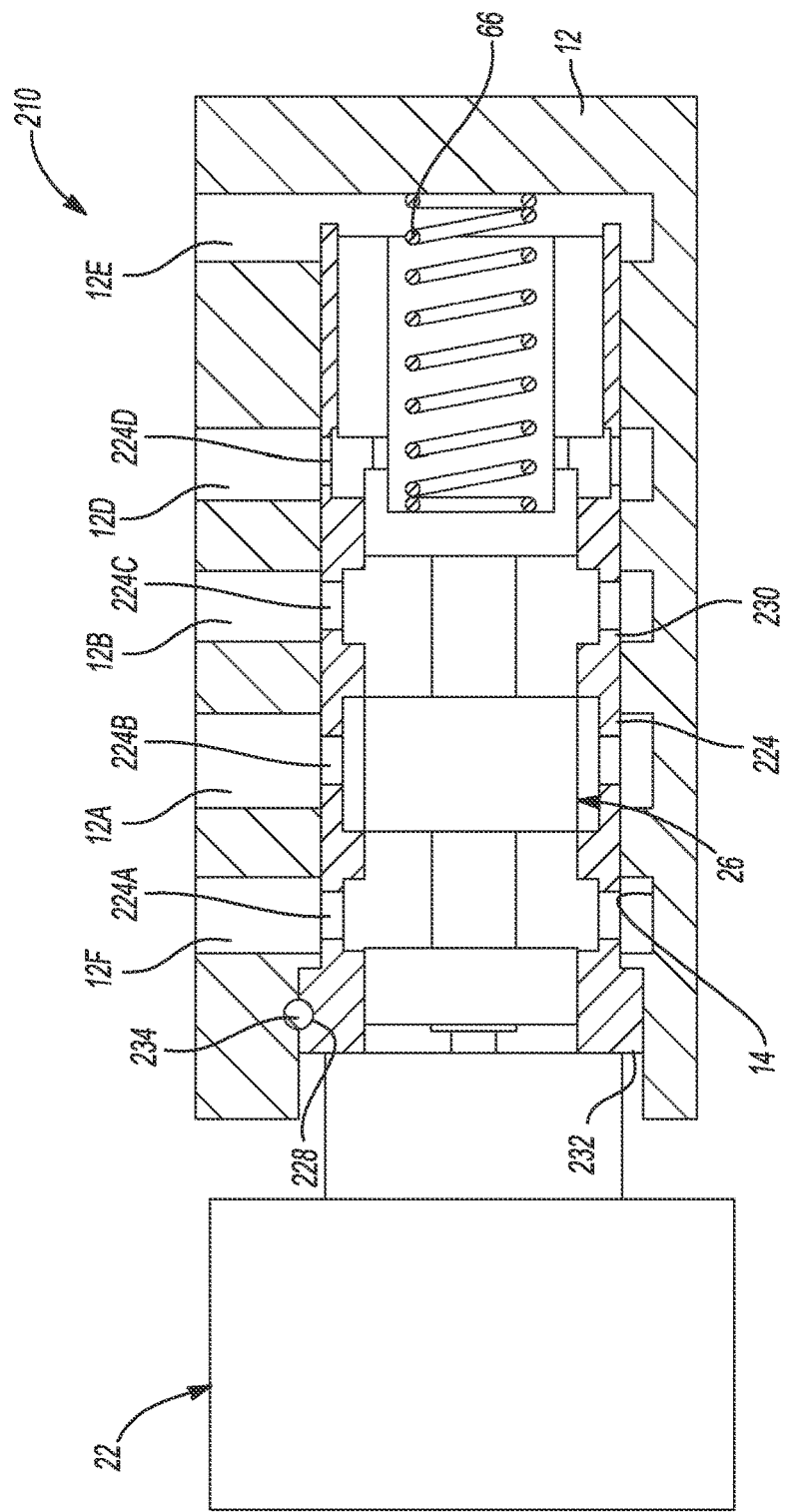

NORMALLY HIGH ACTING LINEAR FORCE SOLENOID

CROSS-REFERENCE TO RELATED APPLICATIONS

This application claims the benefit of U.S. Provisional Application No. 62/073,523, filed on Oct. 31, 2014, which is herein incorporated by reference in its entirety.

FIELD

The invention relates generally to a linear force solenoid assembly that acts as normally high, or inversely proportional, and more particularly to a normally high, or inversely proportional, acting linear force solenoid assembly in a valve body of a transmission of a motor vehicle.

BACKGROUND

The statements in this section merely provide background information related to the present disclosure and may or may not constitute prior art.

Typical stepped or continuously variable transmissions employ a hydraulic control system operable to perform various functions within the transmission. These functions include actuating torque transmitting devices such as drive/reverse clutches or torque converter clutches, setting belt pulley positions, transmission cooling, and lubricating the components of the transmission. The hydraulic control system typically includes a valve body that houses a plurality of valves and solenoids. The hydraulic control system is provided pressurized hydraulic fluid from a pump. A plurality of fluid passages formed within the valve body connect the pump to the valves and solenoids which selectively control the supply of pressurized hydraulic fluid to the various components of the transmission.

Solenoids are typically designated as normally high and normally low. A normally high solenoid allows hydraulic fluid to communicate through the solenoid when in a de-energized state. In contrast, a normally low solenoid does not allow hydraulic fluid to communicate through the solenoid when in a de-energized state. In certain configurations, it is desirable to have a normally high solenoid in order to assure the flow of pressurized hydraulic fluid to certain components, such as a drive clutch, during certain operating conditions, such as an electrical failure to the solenoid. However, normally high solenoids are typically more expensive and have larger packaging space than a normally low solenoid. Accordingly, there is a need in the art for a solenoid assembly that has the functionality of a normally high solenoid with the packaging space and costs of a normally low solenoid.

SUMMARY

A solenoid assembly is disposed in a bore of a valve body where the bore includes a plurality of ports. The solenoid assembly includes a bushing or sleeve disposed in the bore. The sleeve has at least one slot that is aligned with at least one of the plurality of ports. A valve is slidably disposed within the sleeve. A solenoid has a movable armature configured to move the valve.

In one aspect, the solenoid is a linear force solenoid.

In another aspect, the sleeve is machined is formed by casting.

In another aspect, the valve has first, second, third, and fourth lands, and the fourth land is disposed within the sleeve and the first, second, and third lands are in contact with the bore.

In another aspect, the valve is moveable between a first position and a second position.

In another aspect, a spring is disposed in the bore and is in contact with the valve to bias the valve to the first position.

In another aspect, the valve includes a land that partially defines a fluid chamber associated with the slot, and the land is a positive axial distance from a corner of the slot when the valve is in the first position while still substantially closing the slot from communicating with the fluid chamber.

In another aspect, the sleeve includes a hole disposed in an outer surface of the sleeve and an alignment pin is disposed within the hole to radially align the slot with the at least one port.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 5 is a cross-section view of still another embodiment of a solenoid assembly according to the principles of the present invention.

DETAILED DESCRIPTION

The following description is merely exemplary in nature and is not intended to limit the present disclosure, application, or uses.

Figure 1:
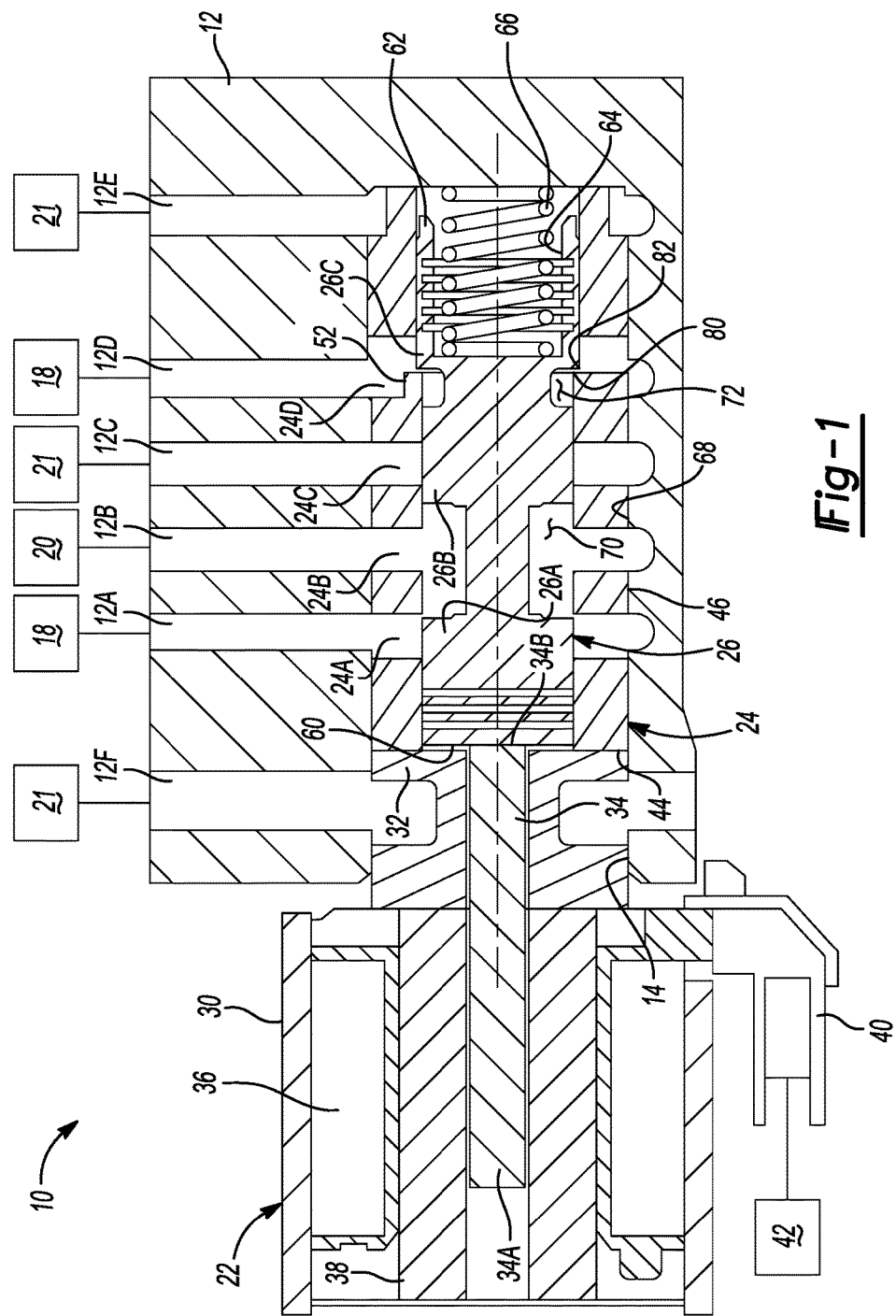
FIG. 1 is a cross-section view of a solenoid assembly in a first operating condition according to the principles of the present invention.

With reference to FIG. 1, a solenoid assembly for use in a hydraulic control system in a transmission (not shown) of a motor vehicle (not shown) is illustrated and generally indicated by reference number 10. The solenoid assembly 10 is housed within a valve body 12. The valve body 12 is a housing that is mounted within the vehicle transmission and defines a plurality of bores to house valves and solenoids and fluid passages to communicate hydraulic fluid, or transmission oil, to various components of the transmission. In the particular example provided, the valve body 12 defines a bore 14 for housing the solenoid assembly 10. A plurality of ports 12A-F communicate with the bore 14. Fluid port 12A is a control port that communicates with a control subsystem 18. The control subsystem 18 may be a clutch actuator subsystem, an electronic transmission range selection subsystem, a pulley control subsystem, or any other subsystem found within a hydraulic control system of a transmission that uses hydraulic fluid to actuate a transmission component. Fluid port 12B is a line feed port that communicates with a pressure regulation subsystem 20. The pressure regulation subsystem 20 includes a pressure regulator valve (not shown) that receives hydraulic fluid from a pump (not shown). The pressure regulator valve regulates the pressure of the hydraulic fluid and communicates the pressurized hydraulic fluid to port 12B. Port 12C is an exhaust port that communicates with a sump 21 or an exhaust backfill circuit. The sump 21 is a tank or reservoir preferably disposed at the bottom of a transmission housing to which the hydraulic fluid returns and collects from various components and regions of the transmission. Port 12D is a feedback port that communicates with the control port 12A, either directly or through the control subsystem 18. Fluid port 12E is an exhaust port that communicates with the sump 21 of the transmission or an exhaust backfill circuit. Port 12F is an exhaust port that communicates with the sump 21 or an exhaust backfill circuit.

The solenoid assembly 10 generally includes a solenoid 22, a bushing or sleeve 24, and a spool valve 26. The solenoid 22 is a linear force solenoid that includes a coil housing 30 connected to an end cap 32. A moveable plunger or armature 34 extends out from the end cap 32. The armature 34 is moveable between a first position, shown in FIG. 1, and a second position shown in FIG. 2. Movement of the armature 34 selectively moves the spool valve 26, as will be described in greater detail below.

An electrical coil or other resistance element 36 is disposed about or wrapped around an inner sleeve 38 disposed within the coil housing 30. The coil 36 is connected to a connector port 40 disposed on an outside of the coil housing 30. The connector port 40 is interconnected to an electronic transmission control module (ETCM) 42, another type of controller such as an engine controller, a hybrid controller, a body controller, etc., or to another power source. The coil 36 is enclosed and protected by the coil housing 30.

The armature 34 includes a base portion 34A slidably disposed within the inner sleeve 38 and a distal end portion or contact head 34B. The base portion 34A is preferably made from steel, iron or another ferro-magnetic material. The contact head 34B is disposed outside the coil housing 30 and the end cap 32. The contact head 34B is in contact with the spool valve 26.

The bushing 24 is generally cylindrical and is disposed within the bore 14 of the valve body 12. One distal end 44 of the bushing 24 is connected to the end cap 32. The bushing 24 includes a plurality of slots 24A-D that are milled through an outer cylindrical surface 46 of the bushing 24. The slots 24A-D in the bushing 24 are in alignment with the ports 12A-D in the valve body 12, respectively.

Figure 3:
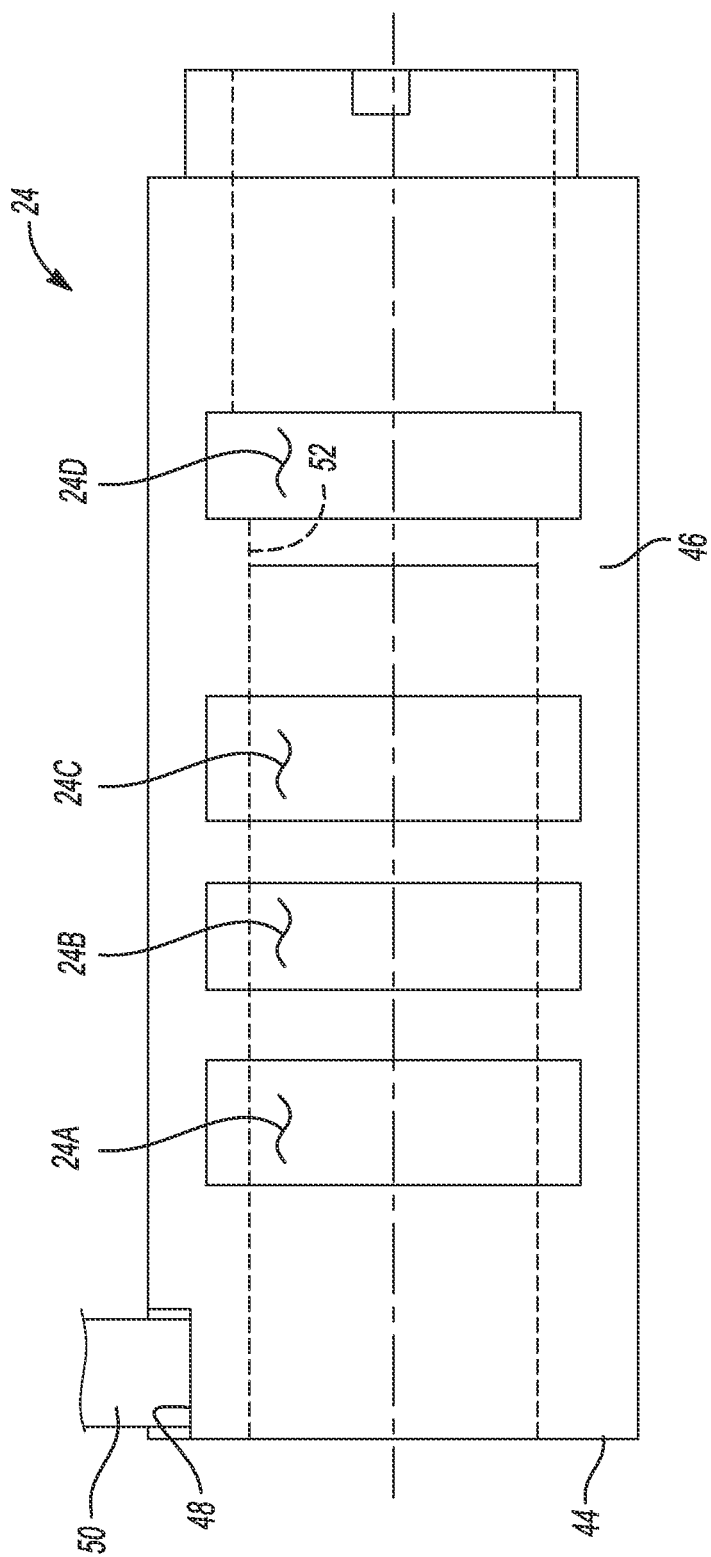
FIG. 3 is a side view of a bushing in the solenoid assembly shown in FIGS. 1 and 2.

Turning to FIG. 3, the bushing 24 includes a hole 48 formed, preferably by broaching, in the outer surface 46 of the bushing 24 adjacent the end 44. The hole 48 is sized to receive an alignment pin 50. The alignment pin 50 is also received within the valve body 12. The alignment pin 50 radially aligns the slots 24A-D with the slots 12A-D during assembly of the bushing 24 within the bore 14 of the valve body 12. The pin 50 also retains the bushing 24 within the valve body 12. In an alternate embodiment, the alignment pin may be replaced with various other features that align and retain the bushing 24. For example the alignment pin 50 may be replaced with an alignment feature on the coil housing 30 or valve body 12 that aligns the bushing 24. The bushing 24 further includes a groove 52 formed, preferably by broaching, in the outer surface 46 of the bushing 24 adjacent the slot 24D. The groove 52 allows hydraulic fluid communication from port 12D through slot 24D by partially enlarging the outer opening of the slot 24D while not enlarging the inner opening of the slot 24D. In yet another embodiment, the features described above for the bushing 24 may be applied to, i.e. machined into, the inner surface or bore 14 of the valve body 12.

Returning to FIGS. 1 and 2, the spool valve 26 is slidably disposed within the bushing 24. The spool valve 26 includes a first distal end or surface 60 and a second distal end or surface 62. The first distal end 60 is in contact with the armature 34 of the solenoid 22. The second distal end 62 defines a spring bore 64 for receiving a spring 66 therein. The spool valve 26 includes three lands 26A-C that contact an inner surface 68 of the bushing 24. The first land 26A, the second land 26B, and the inner surface 68 of the bushing 24 cooperate to define a fluid transfer area or first fluid chamber 70. The second land 26B, the third land 26C, and the inner surface 68 of the bushing 24 cooperate to define a feedback area or second fluid chamber 72.

Figure 2:
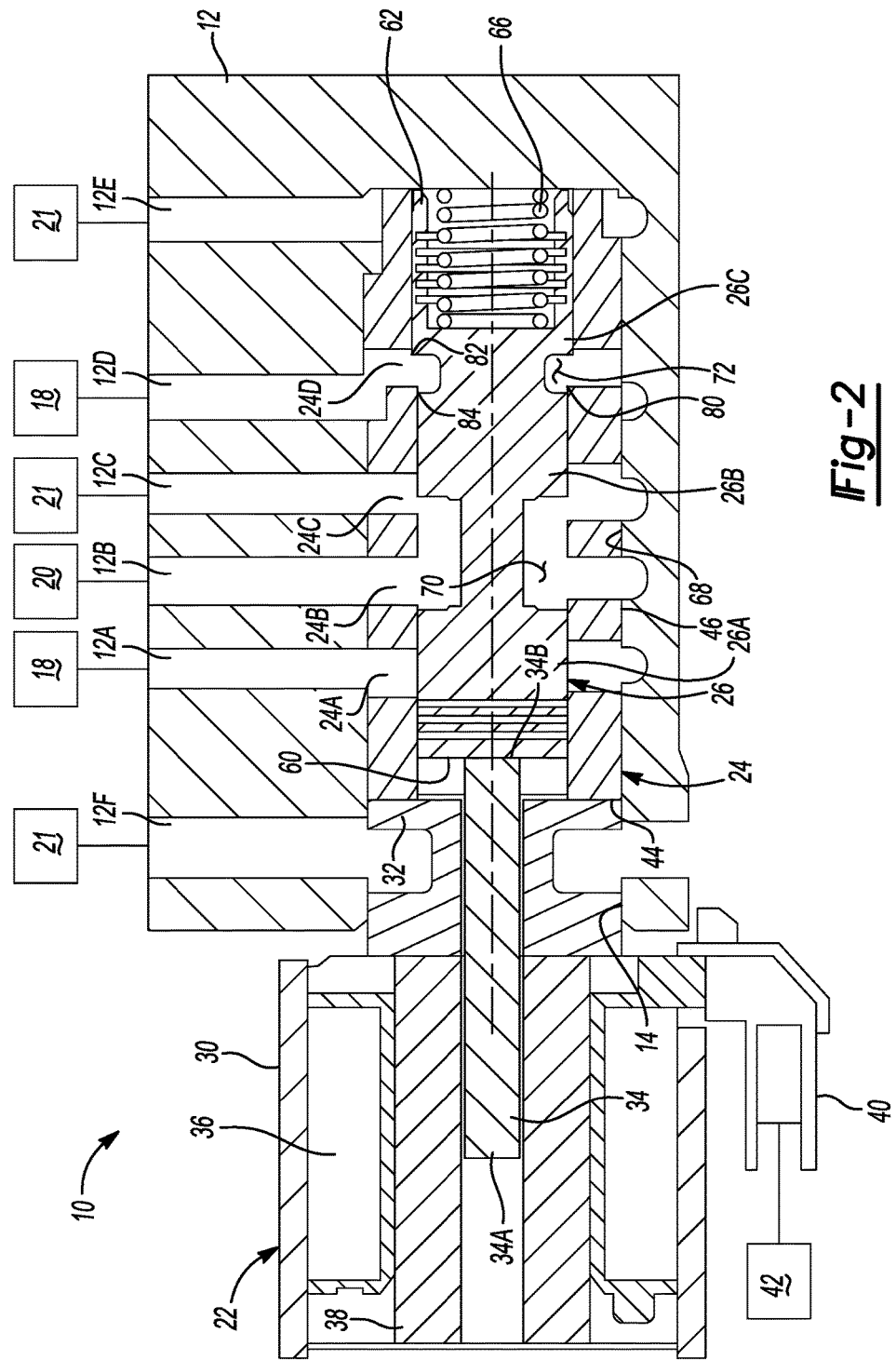
FIG. 2 is a cross-section view of a solenoid assembly in a second operating condition according to the principles of the present invention.

The spool valve 26 is moveable between a first position, shown in FIG. 1, and a second position, shown in FIG. 2. In the first position (FIG. 1), fluid port 12B communicates via slot 24B and fluid transfer chamber 70 through slot 24A to fluid port 12A, thus providing pressurized hydraulic fluid to flow from the pressure regulator subsystem 20 to the control subsystem 18. In addition, land 26B closes slot 24C and port 12C and land 26C substantially closes slot 24D and port 12D. During assembly of the bushing 24, the valve 26 and the spring 66 combination into the bore 14, the spring 66 may bottom out on the end of the bore 14 of the valve body 12 and push the valve 26 to the left in FIGS. 1 and 2 until an inner corner or edge 80 of slot 24D of the bushing 24 stops an outer corner or edge 82 of the land 26C. Though this contact force is relatively low (approximately 12N-15N), this contact can potentially raise a burr or deform the corner 80 of the bushing 24 or the corner 82 of the valve 26. If either of these corners 80 or 82 are functional, i.e. are in contact, after assembly then the valve 26 could become stuck in the bushing 24 due to the deformation or burr. Therefore, a gap or positive axial distance, indicated by reference letter "d", is maintained between the inner corner 80 of the slot 24D and the outer corner 82 of the land 26C when the valve 26 is de-stroked (i.e. in the first position).

In the second position (FIG. 2), land 26A closes off slot 24A and fluid port 12A. Fluid port 12B communicates via slot 24B and the fluid transfer chamber 70 through slot 24C to fluid port 12C, thus exhausting hydraulic fluid from the pressure regulator subsystem 20. Fluid port 12D communicates via slot 24D with the feedback area 72. To prevent the valve 26 from sticking, as described above, the corner 82 of the land 26C, and a corner 84 of the land 26B, do not contact the corner 80 of the slot 24D (i.e., a positive axial distance is maintained) when the valve 26 is fully stroked (i.e. in the second position).

The spring 66 biases the spool valve 26 to the left in FIGS. 1 and 2, i.e. to the first position or de-stroked position, when the solenoid 22 is de-energized. To move the spool valve 26 to the right in FIGS. 1 and 2, i.e. to the second position or stroked position, the solenoid 22 is energized. For example, to move the armature 34 and thus the spool valve 26 to the second position, the ETCM 42 commands an electric current through the coil 36. The electrical current flowing through the coil 36 generates a magnetic field, and the direction of this magnetic field with regards to its North and South Poles is determined by the direction of the current flow within the coil 36. The strength of this magnetic field can be increased or decreased by controlling the amount of current flowing through the coil 36. The armature 34 disposed within the coil 36 is attracted towards the center of the coil 36 by a magnetic flux. Thus the armature 34 moves or strokes within the inner sleeve 38 and compresses the biasing member 66 as the armature 34 moves the spool valve 26 to the right in FIGS. 1 and 2. In addition, pressurized hydraulic fluid acting on the land 26C within the feedback area 72 creates a force that cooperates with the force of the armature 34 acting on the spool valve 26 to move the spool valve 26 to the second position. Therefore, when the solenoid is de-energized, the solenoid assembly 10 defaults to a normally high or open position where the fluid port 12B communicates with the fluid port 12A.

Figure 4:
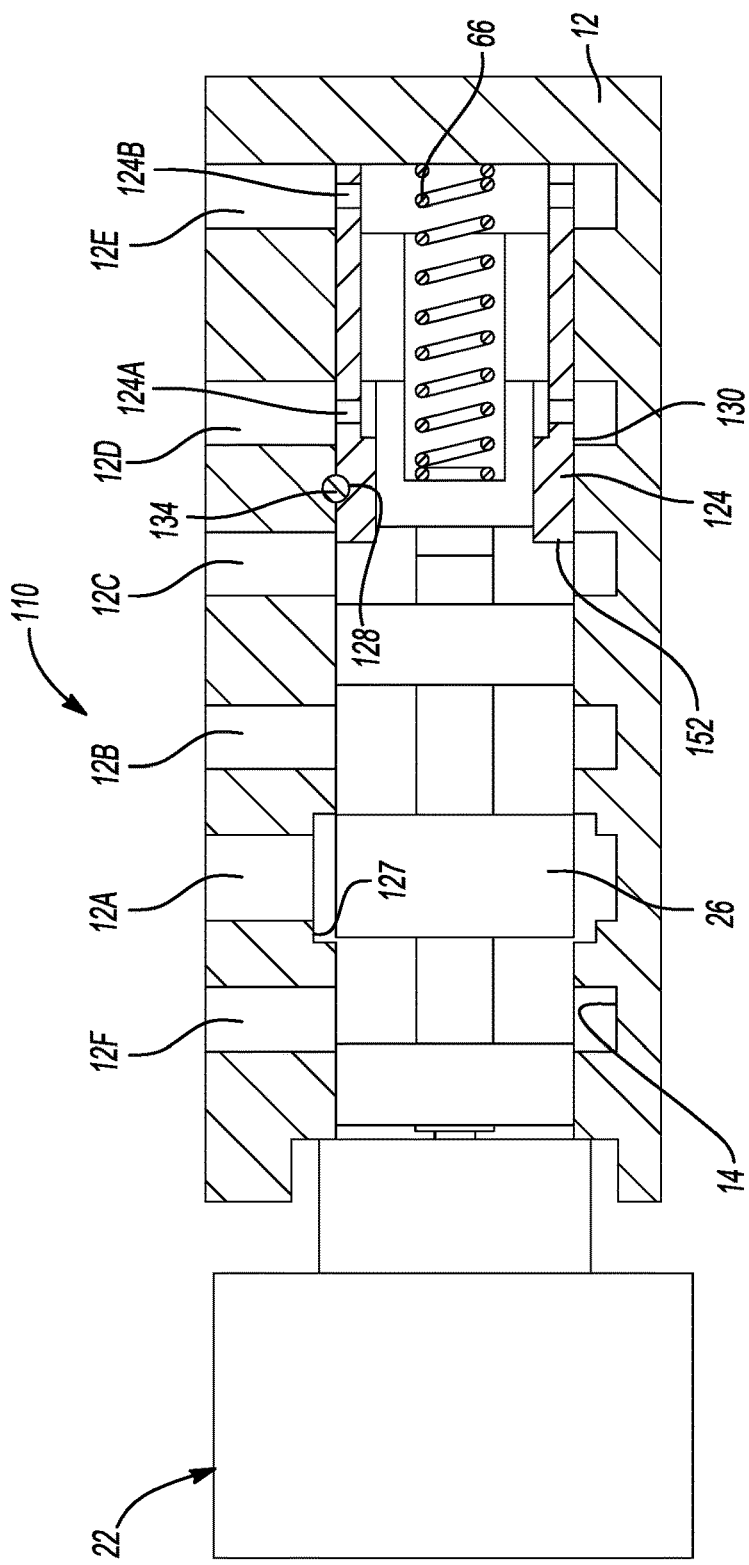
FIG. 4 is a cross-section view of another embodiment of a solenoid assembly according to the principles of the present invention.

With reference to FIG. 4, an alternate embodiment of a solenoid assembly is illustrated and generally indicated by reference number 110. The solenoid assembly 110 is substantially similar to the solenoid assembly 10 illustrated in FIGS. 1 and 2, and therefore like components are indicated by like reference numbers. However, the solenoid assembly 110 includes a bushing 124 and a valve 126. The bushing 124 is axially shorter than the bushing 24 and does not extend axially to cover ports 12A-C and 12F. Instead, port 12A includes an enlarged opening 127. The bushing 124 includes two slots 124A and 124B. Slot 124A is in communication with the fluid port 12D and slot 124B is in communication with the fluid port 12E. The slots 124A and 124B are smaller than the ports 12D and 12E as measured along a longitudinal axis of the spool valve 26. The bushing 124 includes a hole 128 formed, preferably by broaching, in an outer surface 130 of the bushing 124 adjacent an end 132. The hole 128 is sized to receive an alignment pin 134. The alignment pin 134 is also received within the valve body 12. The alignment pin 134 radially aligns the slots 124A-B with the slots 12D-E during assembly of the bushing 124 within the bore 14 of the valve body 12. The pin 134 also retains the bushing 124 within the valve body 12. The valve 126 has four lands 126A-D. Lands 126A-C are disposed within the bore 14 while only land 126D is disposed within the bushing 124. The solenoid assembly 110 operates in a manner similar to that described above for the solenoid assembly 10.

Turning now to FIG. 5, another embodiment of a solenoid assembly is illustrated and generally indicated by reference number 210. The solenoid assembly 210 is substantially similar to the solenoid assembly 10 illustrated in FIGS. 1 and 2, and therefore like components are indicated by like reference numbers. However, the exhaust port 12C has been removed and the bushing 24 has been replaced with a bushing 224. The bushing 224 includes slots 224A-D. Slot 224A is in communication with the fluid port 12F, slot 224B is in communication with the fluid port 12A, slot 224C is in communication with the fluid port 12B, and slot 224D is in fluid communication with the fluid port 12D. The slots 224A-D are smaller than the ports 12A, 12B, 12D, and 12E as measured along a longitudinal axis of the spool valve 26. The bushing 224 includes a hole 228 formed, preferably by broaching, in an outer surface 230 of the bushing 224 adjacent an end 232. The hole 228 is sized to receive an alignment pin 234. The alignment pin 234 is also received within the valve body 12. The alignment pin 234 radially aligns the slots 224A-D with the slots 12A, 12B, 12D, and 12E during assembly of the bushing 224 within the bore 14 of the valve body 12. The pin 234 also retains the bushing 224 within the valve body 12. The solenoid assembly 210 operates in a manner similar to that described above for the solenoid assembly 10.

The description of the invention is merely exemplary in nature and variations that do not depart from the gist of the invention are intended to be within the scope of the invention. Such variations are not to be regarded as a departure from the spirit and scope of the invention.

The following is claimed:

1. An assembly comprising:
   a valve body that defines a bore and a first port, a second port, a third port, and a fourth port each in communication with the bore;
   a bushing disposed in the bore, the bushing having a first slot, a second slot, a third slot, and a fourth slot in communication with the first port, the second port, the third port, and the fourth port, respectively,
   a valve slidably disposed within the bushing and moveable between a first position and a second position, wherein the valve includes a first land, a second land, and a third land each in contact with an inner surface of the bushing, and the first and second lands define a first fluid chamber and the second and third lands define a second fluid chamber, and wherein the first fluid chamber is in selective communication with the first, second, and third slots and the second fluid chamber is in selective communication with the fourth slot, wherein the third land includes a corner adjacent the second fluid chamber and the third slot includes an edge axially opposed to the corner and co-planar with the inner surface of the bushing, and the corner of the third land is disposed a positive axial distance from the edge of the third slot when the valve is in the first position, wherein the valve allows communication between the second slot and the first slot and substantially closes the third slot and the fourth slot when in the first position and the valve allows communication between the second slot and the third slot and closes the first slot when in the second position, and wherein the valve is fully de-stroked against a spring when in the first position and the valve is fully stroked against the spring when in the second position; and
   a solenoid having a movable armature configured to move the valve between the first and second positions.

2. The assembly of claim 1 wherein the solenoid is a linear force solenoid.

3. The assembly of claim 1 wherein the first, second, third, and fourth slots are smaller than the first, second, third, and fourth ports, respectively, as measured along a longitudinal axis of the valve.

4. The assembly of claim 1 further comprising a spring disposed in the bore and in contact with the valve to bias the valve to the first position, and wherein the solenoid moves the valve to the second position when the solenoid is energized.

5. The assembly of claim 1 wherein the bushing includes a hole disposed in an outer surface of the bushing and an alignment pin is disposed within the hole to radially align the first, second, third, and fourth slots with the first, second, third, and fourth ports, respectively.

6. The assembly of claim 1 further comprising a pressure regulator subsystem for providing pressurized hydraulic fluid in communication with the second port and a control subsystem in fluid communication with the first port and the fourth port.

7. An assembly comprising:
   a valve body that defines a bore and a first port, a second port, a third port, and a fourth port each in communication with the bore;
   a bushing disposed in the bore, the bushing having a first slot, a second slot, a third slot, and a fourth slot in communication with the first port, the second port, the third port, and the fourth port, respectively, a valve slidably disposed within the bushing and moveable between a first position and a second position, wherein the valve includes a first land, a second land, and a third land each in contact with an inner surface of the bushing, and the first and second lands define a first fluid chamber and the second and third lands define a second fluid chamber, and wherein the first fluid chamber is in selective communication with the first, second, and third slots and the second fluid chamber is in selective communication with the fourth slot, wherein the third land includes a corner adjacent the second fluid chamber and the third slot includes an edge axially opposed to the corner and co-planar with the inner surface of the bushing, and the corner of the third land is disposed a positive axial distance from the edge of the third slot when the valve is in the first position, and wherein the valve allows communication between the second slot and the first slot and substantially closes the third slot and the fourth slot when in the first position and the valve allows communication between the second slot and the third slot and closes the first slot when in the second position; and a solenoid having a movable armature configured to move the valve between the first and second positions, and wherein the corner of the third land is disposed a positive axial distance from the edge of the third slot when the valve is in the second position, wherein the third slot of the bushing further includes a second edge co-planar with the inner surface of the bushing, and the second land includes a corner adjacent the third fluid chamber and the corner of the second land is disposed a positive axial distance from the second edge of the third slot when the valve is in the second position.

8. An assembly comprising:

a valve body that defines a bore and a first port, a second port, a third port, and a fourth port each in communication with the bore;

a bushing disposed in the bore, the bushing having a first slot, a second slot, a third slot, and a fourth slot in communication with the first port, the second port, the third port, and the fourth port, respectively, a valve slidably disposed within the bushing and moveable between a first position and a second position, wherein the valve includes a first land, a second land, and a third land each in contact with an inner surface of the bushing, and the first and second lands define a first fluid chamber and the second and third lands define a second fluid chamber, and wherein the first fluid chamber is in selective communication with the first, second, and third slots and the second fluid chamber is in selective communication with the fourth slot, wherein the third land includes a corner adjacent the second fluid chamber and the third slot includes an edge axially opposed to the corner and co-planar with the inner surface of the bushing, and the corner of the third land is disposed a positive axial distance from the edge of the third slot when the valve is in the first position, wherein the valve allows communication between the second slot and the first slot and substantially closes the third slot and the fourth slot when in the first position and the valve allows communication between the second slot and the third slot and closes the first slot when in the second position; and a solenoid having a movable armature configured to move the valve between the first and second positions, and wherein the bushing further includes a groove formed in an outer surface of the bushing adjacent the fourth slot to allow communication from the fourth port through the fourth slot.

* * * * *